United States Patent
Sekimoto et al.

(10) Patent No.: US 11,202,197 B2
(45) Date of Patent: Dec. 14, 2021

(54) PORTABLE CONTROL DEVICE, CONTROL SYSTEM, CONTROL METHOD, AND NON-TRANSITORY STORAGE MEDIUM STORING CONTROL PROGRAM

(71) Applicant: OMRON Corporation, Kyoto (JP)

(72) Inventors: Hidehiko Sekimoto, Nagaokakyo (JP); Yuta Nagata, Kusatsu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/639,587

(22) PCT Filed: Sep. 28, 2018

(86) PCT No.: PCT/JP2018/036313
§ 371 (c)(1),
(2) Date: Feb. 17, 2020

(87) PCT Pub. No.: WO2019/069813
PCT Pub. Date: Apr. 11, 2019

(65) Prior Publication Data
US 2021/0136564 A1 May 6, 2021

(30) Foreign Application Priority Data
Oct. 5, 2017 (JP) .............................. JP2017-194828

(51) Int. Cl.
*H04W 8/24* (2009.01)
*H04W 4/021* (2018.01)
*H04W 64/00* (2009.01)

(52) U.S. Cl.
CPC .............. *H04W 8/24* (2013.01); *H04W 4/021* (2013.01); *H04W 64/00* (2013.01)

(58) Field of Classification Search
CPC ......... H04M 1/72403; H04M 1/72463; H04M 1/72457; H04L 67/18; H04W 12/63
See application file for complete search history.

(56) References Cited

U.S. PATENT DOCUMENTS 9,363,221 B1 * 6/2016 Ozog ................. G06Q 30/0251
9,471,624 B1 * 10/2016 Patil ........................ G06F 16/24
(Continued)

FOREIGN PATENT DOCUMENTS

| | | |
|---|---|---|
| EP | 3076645 | 10/2016 |
| JP | 2003037749 | 2/2003 |

(Continued)

OTHER PUBLICATIONS

"International Search Report (Form PCT/ISA/210) of PCT/JP2018/036313," dated Dec. 25, 2018, with English translation thereof, pp. 1-2.

(Continued)

*Primary Examiner* — Dung Hong
(74) *Attorney, Agent, or Firm* — JCIPRNET

(57) ABSTRACT

Provided is a portable control device (100) comprising: a storage unit (105) for storing control data that includes a program for controlling a system and data used for the program; and a position control unit (104) for acquiring the position of the device itself. The portable control device (100) includes a main control unit (103) for deleting control data from the storage unit (105) when the position acquired by the position control unit (104) is outside a first area.

20 Claims, 7 Drawing Sheets

(56) References Cited

U.S. PATENT DOCUMENTS

| | | | | |
|---|---|---|---|---|
| 2013/0061218 | A1* | 3/2013 | Moore | G06F 8/62 |
| | | | | 717/177 |
| 2013/0210404 | A1* | 8/2013 | Curtis | H04L 67/34 |
| | | | | 455/418 |
| 2015/0011187 | A1* | 1/2015 | Wetzold | H04W 4/02 |
| | | | | 455/411 |
| 2015/0172920 | A1* | 6/2015 | Ben Ayed | H04L 63/0492 |
| | | | | 713/172 |
| 2015/0208196 | A1* | 7/2015 | Nigam | H04W 4/02 |
| | | | | 455/456.3 |
| 2016/0057228 | A1* | 2/2016 | Yasaki | G06F 21/121 |
| | | | | 709/213 |
| 2016/0094579 | A1* | 3/2016 | Pate | H04W 12/64 |
| | | | | 726/23 |
| 2016/0173606 | A1* | 6/2016 | Noda | H04L 67/1097 |
| | | | | 709/217 |
| 2016/0357599 | A1* | 12/2016 | Glatfelter | G06Q 10/06311 |
| 2017/0032281 | A1* | 2/2017 | Hsu | G06N 7/005 |
| 2017/0094490 | A1* | 3/2017 | Ryan | H04W 4/021 |
| 2017/0344624 | A1* | 11/2017 | DeLuca | G06F 16/287 |

FOREIGN PATENT DOCUMENTS

| | | |
|---|---|---|
| JP | 2003263332 | 9/2003 |
| JP | 2008131594 | 6/2008 |
| JP | 2015148892 | 8/2015 |

OTHER PUBLICATIONS

"Written Opinion of the International Searching Authority (Form PCT/ISA/237) of PCT/JP2018/036313," dated Dec. 25, 2018, with English translation thereof, pp. 1-10.

"Office Action of Japan Counterpart Application", dated Apr. 20, 2021, with English translation thereof, p. 1-p. 9.

"Search Report of Europe Counterpart Application", dated Mar. 31, 2021, p. 1-p. 7.

* cited by examiner

PORTABLE CONTROL DEVICE, CONTROL SYSTEM, CONTROL METHOD, AND NON-TRANSITORY STORAGE MEDIUM STORING CONTROL PROGRAM

CROSS-REFERENCE TO RELATED APPLICATION

This application is a 371 application of the international PCT application serial no. PCT/JP2018/036313, filed on Sep. 28, 2018, which claims the priority benefit of Japan application no. 2017-194828, filed on Oct. 5, 2017. The entirety of the above-mentioned patent application is hereby incorporated by reference herein and made a part of this specification.

BACKGROUND

Technical Field

The present invention relates to a technology for storing and deleting control data.

Background Art

A technology for guaranteeing security of confidential information or the like by deleting data downloaded to a portable communication terminal or the like when radio wave strength of the portable communication terminal or the like is equal to or less than a predetermined threshold is known (for example, see Patent Literature 1).

CITATION LIST

Patent Literature

[Patent Literature 1]
Japanese Patent Laid-Open No. 2015-148892

SUMMARY

Technical Problem

However, when the technology described in Patent Literature 1 is used, data downloaded to a portable control device including a portable communication terminal is not deleted in a place in which the radio wave strength is not equal to or less than the threshold, outside an area designated in a production field such as a factory, and thus there is a problem with security. When the radio wave strength is set to be equal to or less than the threshold outside the area, the radio wave strength in the area becomes weak, and thus there is concern of communication being limited. Further, setting of the radio wave strength also depends on layout of the area and minute setting is considerably difficult.

Accordingly, an objective of the present invention is to improve security by reliably deleting data downloaded to a portable control device when the portable control device is located outside an area.

Solution to Problem

A portable control device includes: a storage unit configured to store control data including a program, which controls a system, and data used for executing the program; a position control unit configured to acquire a position of the device itself; and a main control unit configured to delete the control data from the storage unit when the position acquired by the position control unit is outside a first area.

In this configuration, the control data is deleted when it is determined based on the position of the device itself that the position acquired by the position control unit is outside the first area. That is, radio wave strength does not serve as a determination standard and the control data is deleted in accordance with a relation between an area and the position acquired by the position control unit.

The control data mentioned here includes firmware, a control program, and resource data.

The portable control device includes a communication unit configured to receive the control data. The main control unit may cause the communication unit to receive the control data and store the received control data in the storage unit when the position acquired by the position control unit is within the first area.

In this configuration, when the position of the device itself is within the first area, the control data is received and the control data is stored. That is, the control data is reliably received and stored in an area in which the control data is necessary.

A display control unit of the portable control device displays the control data on a display unit. The main control unit instructs the display control unit to display the control data on the display unit when the position acquired by the position control unit is within the first area. The main control unit instructs the display control unit not to display the control data on the display unit when the position acquired by the position control unit is outside the first area.

In this configuration, when the position of the device itself is within the first area, the control data is displayed on the display unit. When the position of the device itself is outside the first area, the control data is not displayed on the display unit.

The position control unit of the portable control device acquires the position of the device itself using a satellite positioning system.

In this configuration, the position of the device itself can be acquired by the satellite positioning system with high precision.

The first area in the portable control device may be an area where control of the system in which the control data assigned to the first area is used is permitted.

In this configuration, in the first area, it is possible to control the system in which the control data assigned to the first area is used.

A second area in the portable control device may be an area different from the first area and may be an area where control of the system in which the control data assigned to the second area is used is permitted.

In this configuration, in the second area different from the first area, control in which the control data assigned to the second area is used can be performed.

The main control unit of the portable control device may receive a selection of the control data of the first area and the control data of the second area when the position of the device itself is in an area where the first area overlaps the second area.

In this configuration, when the position of the device itself is determined to be located in an area in which a plurality of areas overlap, the user can select the area.

The main control unit of the portable control device may have a function of receiving a selection of whether to delete the control data.

In this configuration, the user can select whether to delete the control data stored in the device itself.

A control system according to the present invention includes: a master storage unit configured to store the control data; a master communication unit configured to transmit the control data; and the portable control device.

In this configuration, it is possible to construct a system that manages the control data and includes the portable control device.

Advantageous Effects of Invention

According to the present invention, it is possible to improve security by reliably deleting data downloaded to a portable control device when the portable control device is located outside an area.

DESCRIPTION OF THE EMBODIMENTS

First Embodiment

Figure 1:
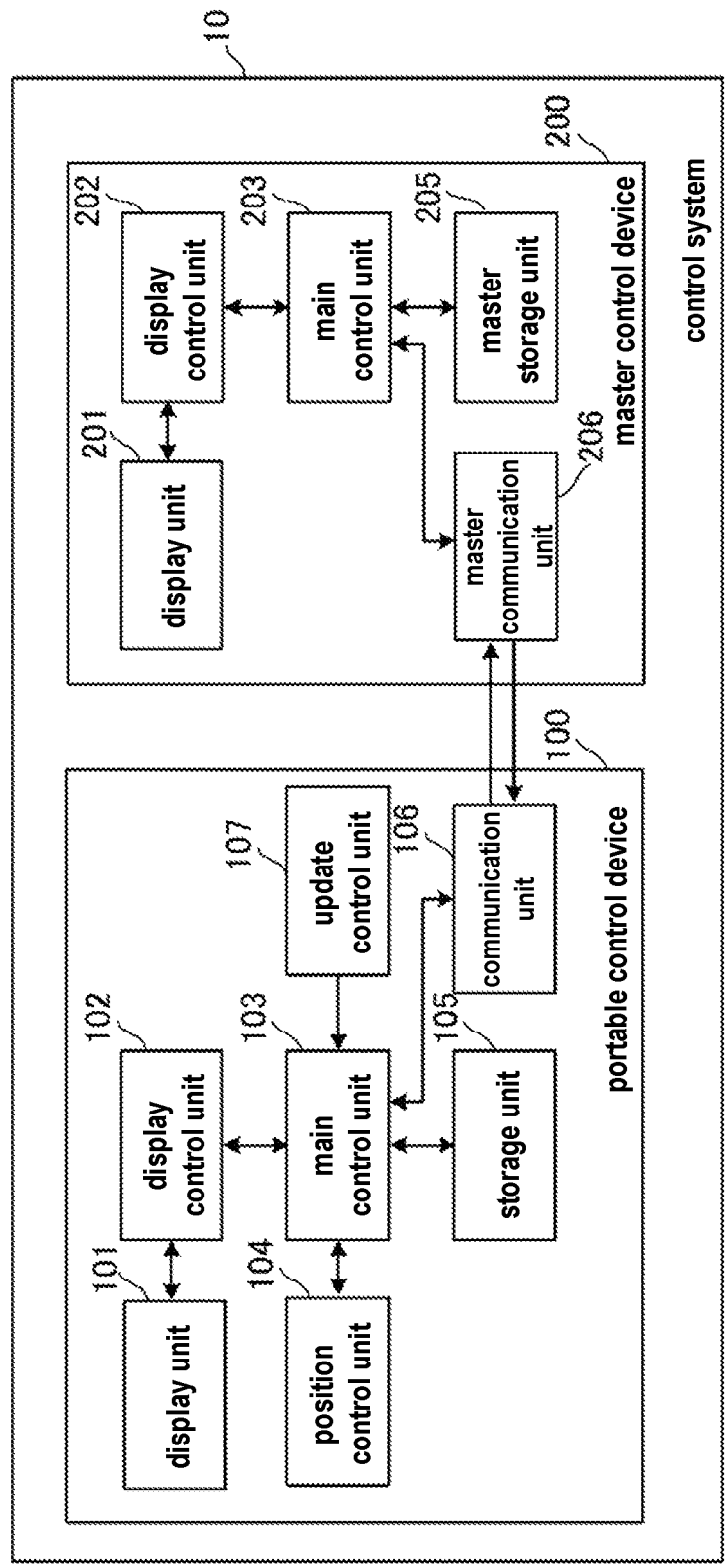
FIG. 1 is a block diagram illustrating a main configuration of a control system according to a first embodiment of the present invention.
Figure 2:
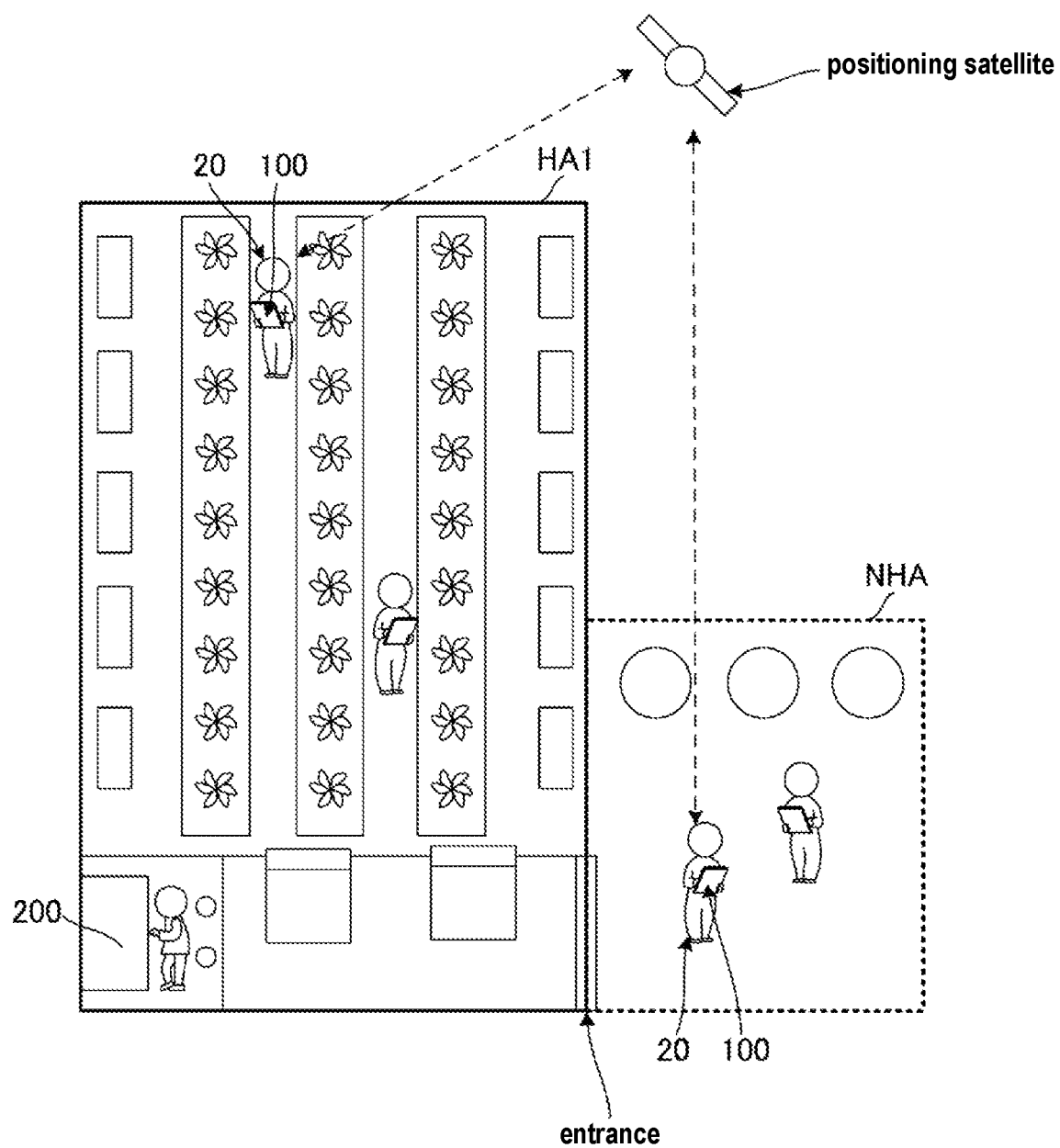
FIG. 2 is a diagram illustrating an overview of the control system according to the first embodiment of the present invention.
Figure 3:
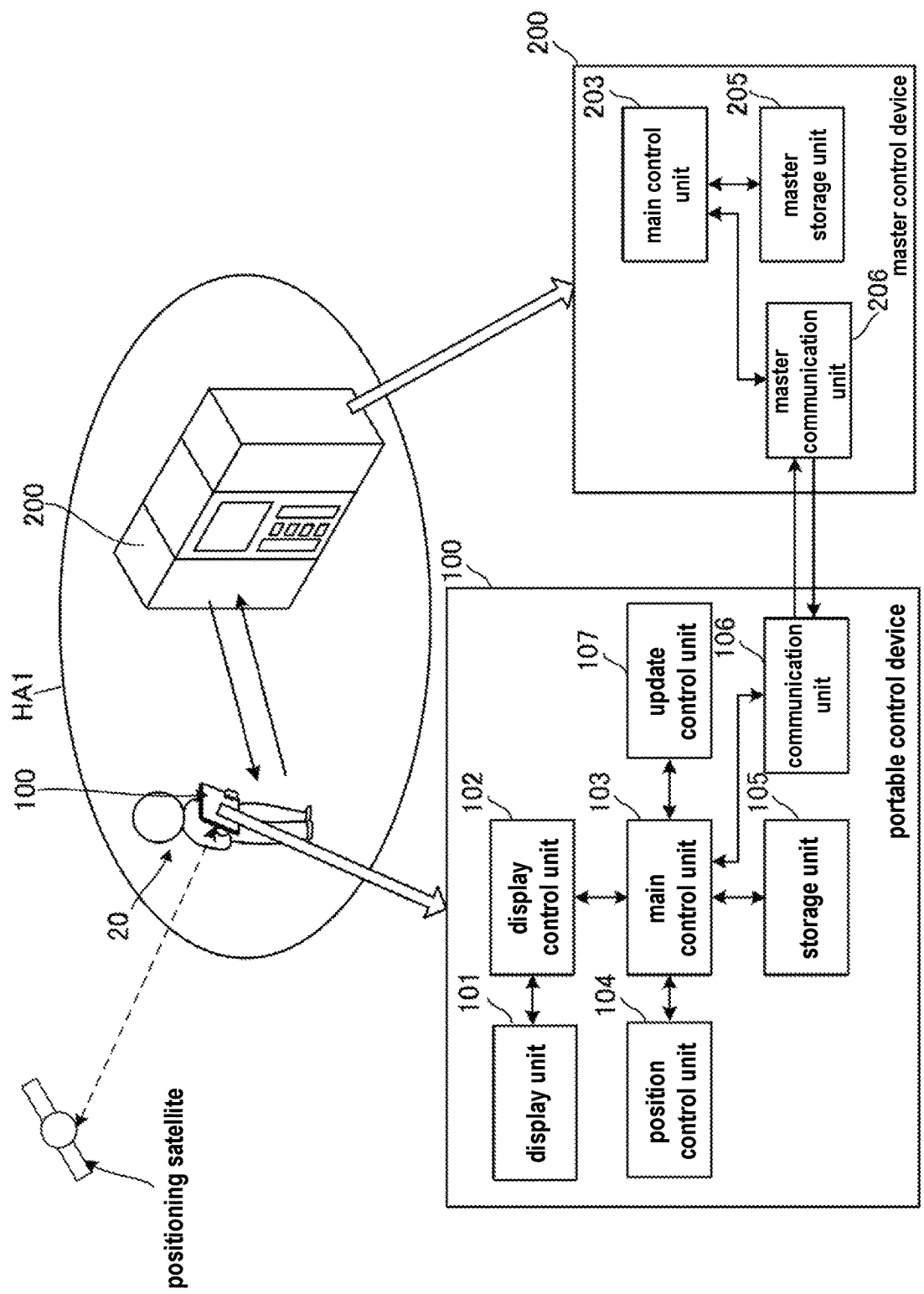
FIG. 3 is an image diagram related to a diagram and a block diagram illustrating an overview when the control data is received according to the first embodiment of the present invention.
Figure 4:
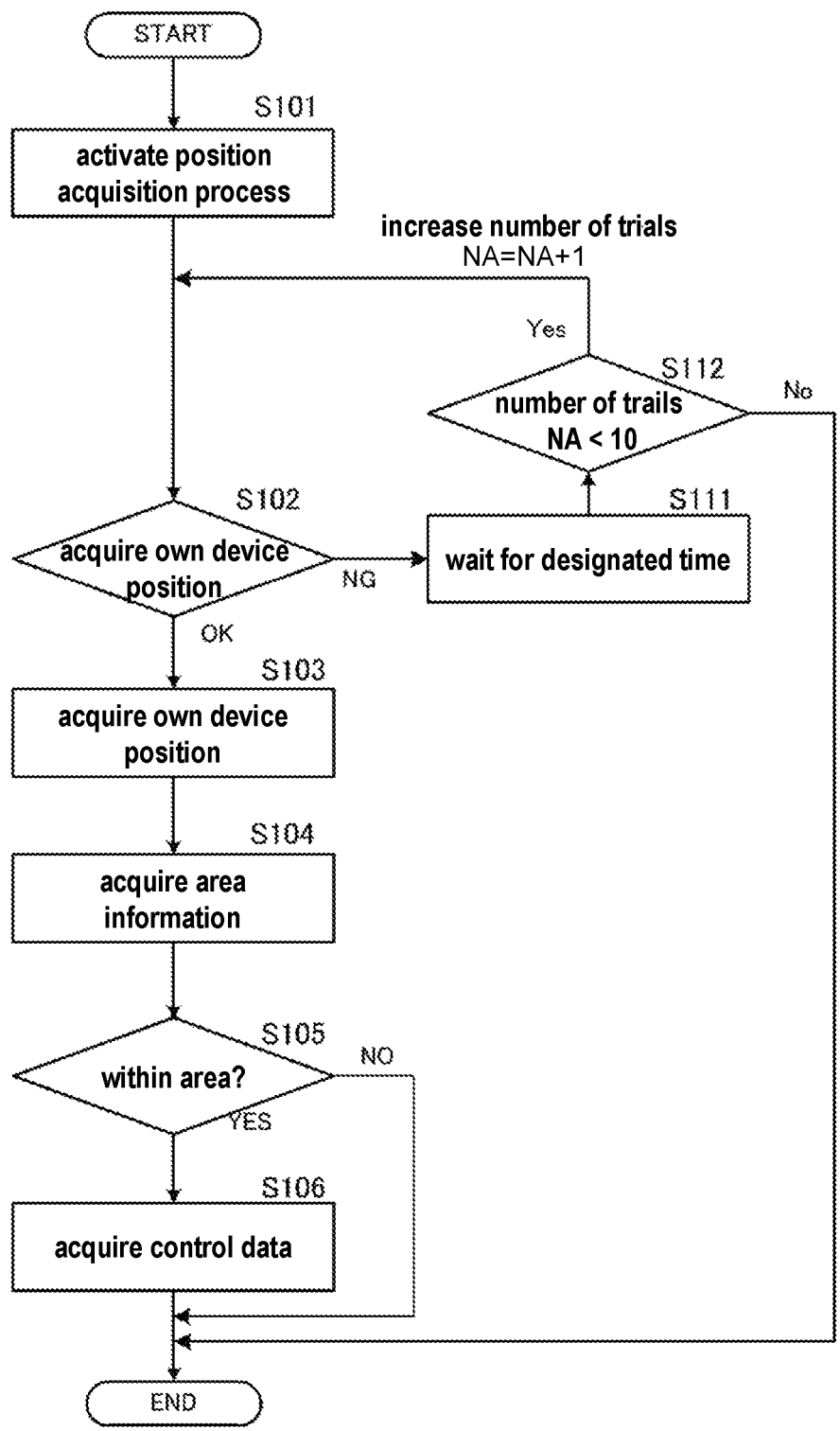
FIG. 4 is a flowchart illustrating an outline of an area acquisition process according to the first embodiment of the present invention.
Figure 5:
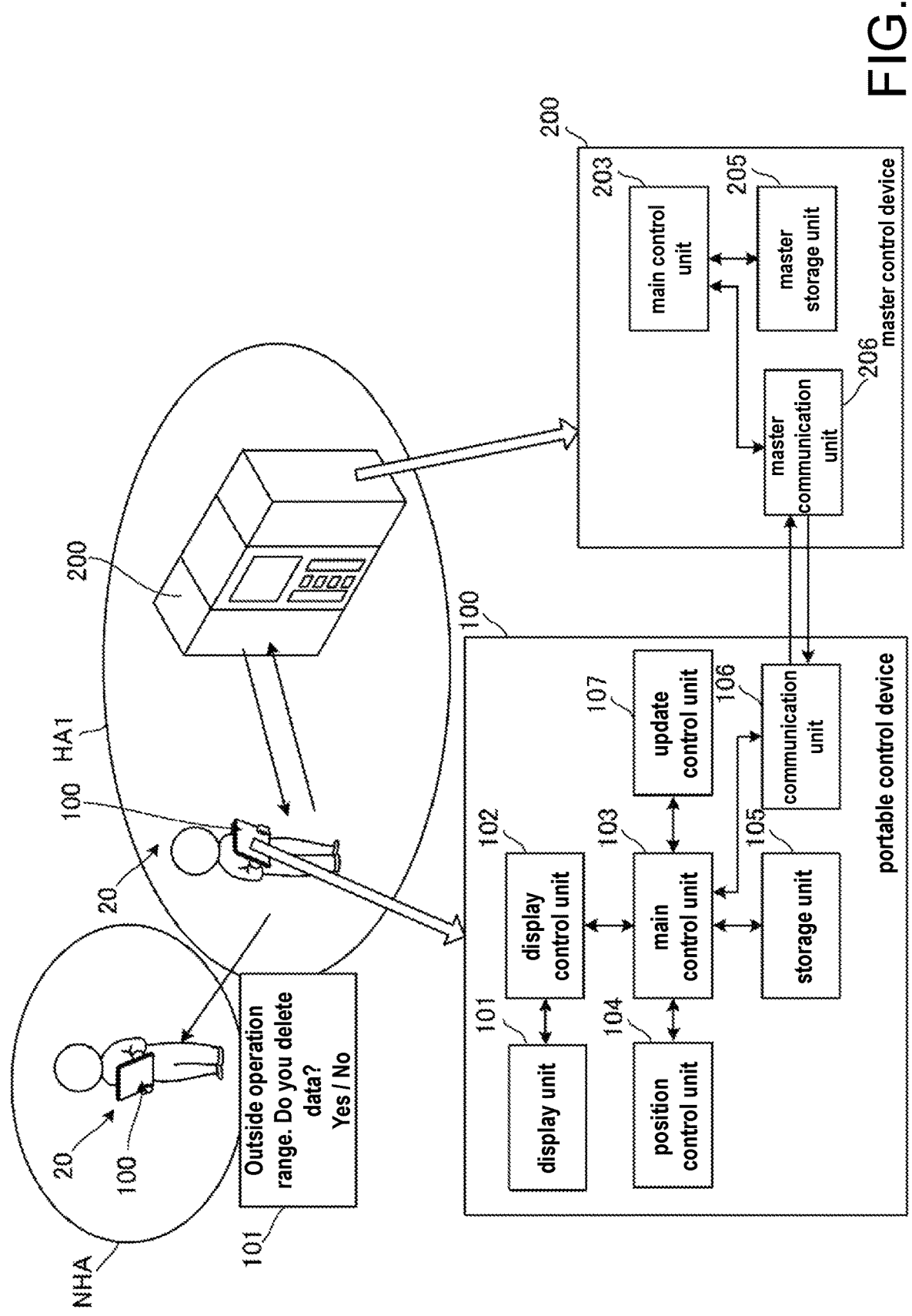
FIG. 5 is an image diagram related to a diagram and a block diagram illustrating an overview when the control data is deleted according to the first embodiment of the present invention.
Figure 6:
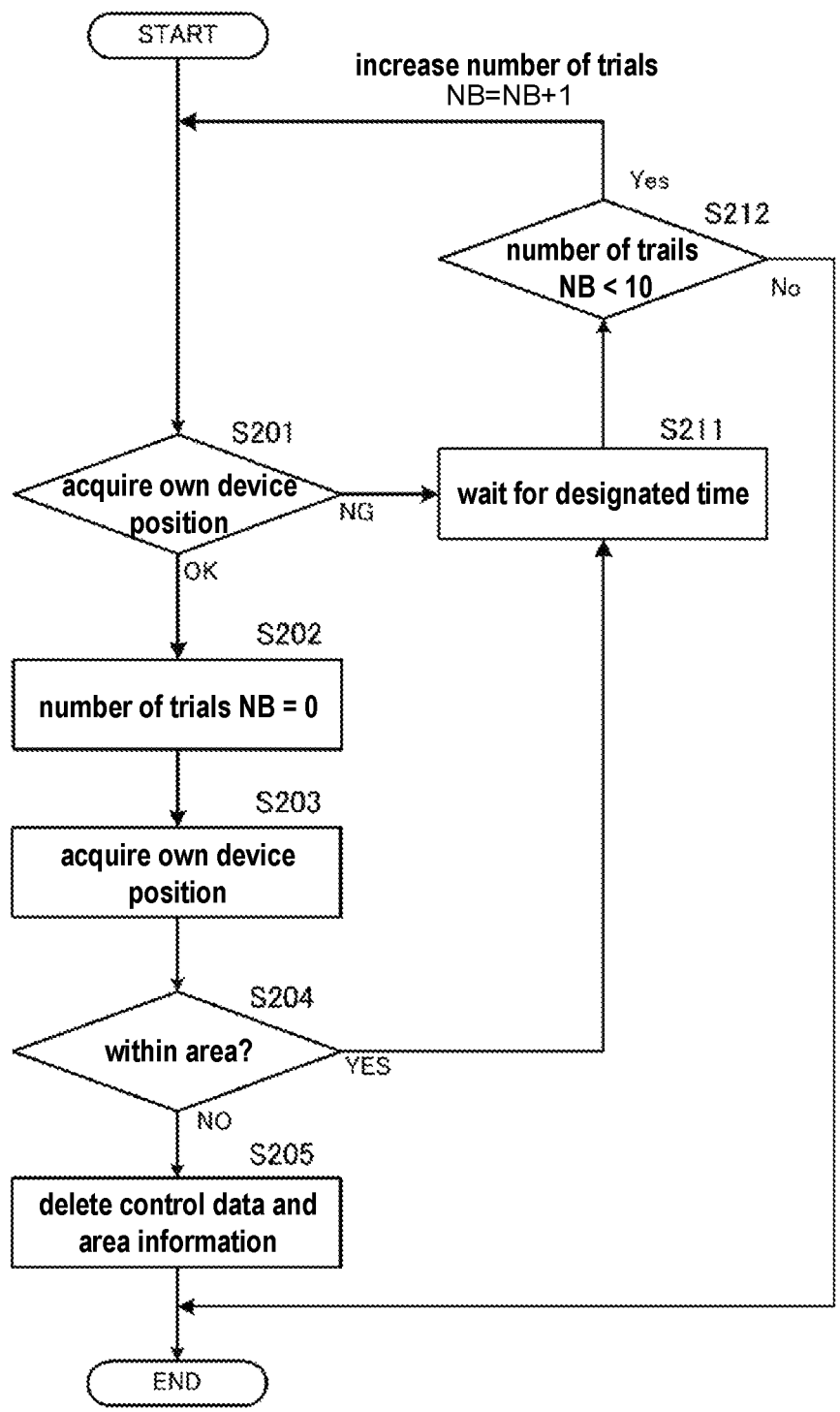
FIG. 6 is a flowchart illustrating an outline of an updating process according to the first embodiment of the present invention.

A portable control device, a control system, a control method, and a control program according to a first embodiment of the present invention will be described with reference to the drawings. FIG. 1 is a block diagram illustrating a main configuration of a control system according to a first embodiment of the present invention. FIG. 2 is a diagram illustrating an overview of the control system according to the first embodiment of the present invention. FIG. 3 is an image diagram related to a diagram and a block diagram illustrating an overview when the control data is received according to the first embodiment of the present invention. FIG. 4 is a flowchart illustrating an outline of an area acquisition process according to the first embodiment of the present invention. FIG. 5 is an image diagram related to a diagram and a block diagram illustrating an overview when the control data is deleted according to the first embodiment of the present invention. FIG. 6 is a flowchart illustrating an outline of an updating process according to the first embodiment of the present invention.

As illustrated in FIG. 1, a control system 10 includes a portable control device 100 and a master control device 200.

The portable control device 100 includes a display unit 101, a display control unit 102, a main control unit 103, a position control unit 104, a storage unit 105, a communication unit 106, and an update control unit 107. The master control device 200 includes a display unit 201, a display control unit 202, a main control unit 203, a master storage unit 205, and a master communication unit 206.

First, a configuration of the portable control device 100 will be described.

The display unit 101 has a display function of a liquid crystal panel or the like and displays control data. The display unit 101 includes an operation interface that includes a position input device such as a touch panel.

The display control unit 102 controls whether to display the control data on the display unit 101. The display control unit 102 receives a process in response to an input operation on the display unit 101 by a user 20 and delivers the received process to the main control unit 103.

The main control unit 103 receives the process delivered from the display control unit 102. The main control unit 103 delivers the control data to be displayed on the display unit 101 to the display control unit 102. The main control unit 103 delivers an instruction to the position control unit 104 to acquire a position of the own device (hereinafter referred to as an own device position) and receives the own device position acquired by the position control unit 104. The main control unit 103 stores the control data in the storage unit 105. The main control unit 103 acquires the control data from the storage unit 105. The main control unit 103 delivers the control data to the communication unit 106 so that the control data is transmitted to and received from the master control device 200. The main control unit 103 receives an instruction from the update control unit 107 so that a process is performed at a constant interval.

The main control unit 103 compares area information from the master control device 200 with the own device position and acquires the control data when the own device is in the area. The main control unit 103 deletes the control data when the own device is outside the area.

The position control unit 104 includes an antenna, receives a positional signal from a positioning satellite not involved in the present invention and acquires the own device position. The position control unit 104 delivers the own device position to the main control unit 103. The positioning satellite is, for example, a GPS satellite.

The storage unit 105 stores the area information and the control data. The area information is control data stored in the storage unit 105 and is information indicating an area in which control of the control system 10 is permitted. The control data includes a program controlling the control system 10 and data used to execute the program. The control data includes firmware, a control program, and resource data.

The communication unit 106 transmits the area information and a request for transmitting the control data to the master control device 200 in response to an instruction from the main control unit 103. The communication unit 106 receives the area information and the control data from the master communication unit 206.

The update control unit 107 has a clocking function and delivers various processes to the main control unit 103 for the processes to be performed at pre-decided timings.

Next, a configuration of the master control device 200 will be described.

The display unit 201 has a display function of a liquid crystal panel or the like and displays information regarding the master storage unit 205. The display unit 201 may include an operation interface that includes a position input device such as a touch panel.

The display control unit 202 controls display on the display unit 201. When the display unit 201 includes the operation interface, the display control unit 202 receives a process in response to an input operation on the display unit 201 by the user 20 and delivers the received process to the main control unit 203.

The main control unit 203 controls the display control unit 202 and the master communication unit 206. The main control unit 203 receives the process delivered from the display control unit 202. The main control unit 203 delivers the control data or the like to be displayed on the display unit 201 to the display control unit 202. The main control unit 203 stores data in the master storage unit 205. The main control unit 203 acquires data from the master storage unit 205. The main control unit 203 delivers the data to the master communication unit 206 for the data to be transmitted to and received from the portable control device 100.

The master storage unit 205 stores the area information and the control data. The master communication unit 206 transmits the area information and the control data stored in the master storage unit 205 to the portable control device 100.

FIG. 2 is a schematic diagram illustrating an example in which the control system 10 is disposed in a plant factory. To facilitate viewing of the drawing, some signs are omitted. As illustrated in FIG. 2, the plant factory is divided into a data maintenance area HA1 and a data non-maintenance area NHA. The data maintenance area HA1 is an area in which the portable control device 100 is permitted to store the control data in the storage unit 105. When the portable control device 100 is located within the data maintenance area HAL the portable control device 100 is permitted to control the control system 10 by using the control data stored in the storage unit 105. The area information is information indicating the data maintenance area HAL The data non-maintenance area NHA is an area in which the portable control device 100 is not permitted to store the control data in the storage unit 105. When the portable control device 100 is located within the data non-maintenance area NHA (in other words, when the portable control device 100 is not located within the data maintenance area HA1), the portable control device 100 is not permitted to control the control system 10. The data maintenance area HA1 corresponds to a first area of the present invention.

In this example, the master control device 200 is disposed in the data maintenance area HAL but it may be disposed in the data non-maintenance area NHA. The user 20 carrying the portable control device 100 can go in back and forth between the data maintenance area HA1 and the data non-maintenance area NHA.

The portable control device 100 acquires the own device position using a positioning signal from the positioning satellite not involved in the present invention by using power-up of the own device, an input operation, the above-described update timing, or the like as a trigger.

The portable control device 100 requests the master control device 200 to transmit the area information and acquires the area information. The portable control device 100 uses the area information to check whether the acquired own device position is within the data maintenance area HA1.

As illustrated in FIGS. 2 and 3, when the own device is in the data maintenance area HAL the portable control device 100 requests the master control device 200 to transmit the control data. The master control device 200 transmits the control data to the portable control device 100. The portable control device 100 receives the control data from the master control device 200.

Thus, the user 20 carrying the portable control device 100 that is within the data maintenance area HA1 can perform an operation related to control of the control system 10, for example, a remote operation of the master control device 200.

More specifically, the portable control device 100 starts an area acquisition process by using power-up of the own device, an input operation, the above-described update timing, or the like as a trigger. The main control unit 103 delivers the area acquisition process to the position control unit 104.

The position control unit 104 performs communication with a positioning satellite not involved in the present invention and acquires the own device position of the portable control device 100. The position control unit 104 delivers the own device position to the main control unit 103. The main control unit 103 delivers the own device position to the display control unit 102. The display control unit 102 delivers the acquisition of the own device position to the display unit 101. The display unit 101 displays the acquisition of the own device position. By using a positioning system in which a positioning satellite such as a GPS satellite is used for positioning, it is possible to obtain the own device position with high precision.

The main control unit 103 delivers a request for transmitting the area information to the communication unit 106. The communication unit 106 transmits the request for transmitting the area information to the master communication unit 206 of the master control device 200.

The master communication unit 206 of the master control device 200 delivers a request for transmitting the area information to the main control unit 203. The main control unit 203 acquires the area information from the master storage unit 205. The main control unit 203 delivers the area information to the master communication unit 206.

The master communication unit 206 transmits the area information to the communication unit 106 of the portable control device 100.

The communication unit 106 of the portable control device 100 receives the area information and delivers the area information to the main control unit 103. The main control unit 103 stores the area information in the storage unit 105 and determines whether the own device position of the portable control device 100 is within the data maintenance area HA1.

When the main control unit 103 determines that the own device position of the portable control device 100 is within the data maintenance area HAL the display control unit 102 receives the request for transmitting the control data by using an operation by the user 20 requesting to transmit the control data to the display unit 101 as a trigger. The display control unit 102 delivers the request for transmitting the control data to the main control unit 103. The main control unit 103 transmits the request for transmitting the control data to the master communication unit 206 of the master control device 200 via the communication unit 106.

The master communication unit 206 of the master control device 200 delivers the request for transmitting the control data to the main control unit 203. The main control unit 203 acquires the control data from the master storage unit 205. The main control unit 203 delivers the control data to the master communication unit 206. The master communication unit 206 transmits the control data to the communication unit 106 of the portable control device 100.

The communication unit 106 of the portable control device 100 receives the control data and delivers the control data to the main control unit 103. The main control unit 103 stores the control data in the storage unit 105 and delivers the control data to the display control unit 102. The display control unit 102 displays the control data on the display unit 101.

Thus, the user 20 carrying the portable control device 100 that is within the data maintenance area HA1 can perform an operation related to control of the control system 10.

FIG. 4 is a flowchart illustrating an outline of the area acquisition process according to the first embodiment of the present invention. The number of times acquisition of the own device position is tried is referred to as the number of trials NA. An initial value of the number of trials NA is 0 and the number of trials NA increases whenever acquisition of the own device position fails. In the flowchart, the area acquisition process ends when the number of trials NA reaches 10.

The portable control device 100 receives a process of acquiring the own device position (S101). The portable control device 100 determines whether the own device position is acquired (S102). In S102, it is determined whether a reception level of a positioning signal is appropriate. When the portable control device 100 determines that the own device position can be acquired (OK in S102), the portable control device 100 acquires the own device position (S103). In S103, the received positioning signal is processed and the own device position is acquired. The portable control device 100 acquires the area information from the master control device 200 (S104). The portable control device 100 determines whether the acquired own device position is within the data maintenance area HA1 (S105). When the own device position is within the data maintenance area HA1 (Yes in S105), the portable control device 100 acquires the control data (S106).

When the portable control device 100 determines that the own device position is not acquirable (NG in S102), the portable control device 100 waits for a designated time (S111). The portable control device 100 determines whether the number of trials NA satisfies the number of trials NA<10 (S112). When the number of trials NA satisfies the number of trials NA<10 (Yes in S112), the portable control device 100 increases the number of trials NA (number of trials NA=NA+1) and determines whether the own device position can be acquired again (S102). When the number of trials NA does not satisfy the number of trials NA<10 (No in S112), the portable control device 100 ends the area acquisition process.

When the acquired own device position is outside the data maintenance area HA1 (No in S105), the portable control device 100 ends the area acquisition process without acquiring the control data. When the portable control device 100 ends the area acquisition process, the portable control device 100 initializes the number of trials NA (number of trials NA=0). When the number of trials NA<10 is not satisfied in FIG. 4, the area acquisition process is ended. However, the value compared with the number of trials NA in this determination is not limited to 10. The number of trials NA can be set freely as long as the number of trials NA is a value equal to or greater than 0.

Next, a process when the portable control device 100 goes out from the data maintenance area HA1 will be described. As illustrated in FIG. 5, within the data maintenance area HA1, the portable control device 100 acquires the area information and the control data from the master control device 200 and stores the area information and the control data in the storage unit 105 in description.

The user 20 is assumed to carry the portable control device 100 and move from the data maintenance area HA1 to the data non-maintenance area NHA. The update control unit 107 delivers the own device position to the main control unit 103 at a preset timing of an update process so that the own device position is acquired. The main control unit 103 delivers the own device position to the position control unit 104 so that the own device position is acquired. The position control unit 104 acquires the own device position of the portable control device 100.

The main control unit 103 compares the area information stored in the storage unit 105 with the current own device position of the portable control device 100 and determines that the own device position is in the data non-maintenance area NHA, that is, is outside the data maintenance area HA1.

The main control unit 103 delivers the fact that the own device position is in the data non-maintenance area NHA to the display control unit 102. Since the own device position is outside an operation range, the display control unit 102 displays a message prompting the user 20 to perform an operation related to selection of whether to delete the control data on the display unit 101.

The display control unit 102 receives a command to delete the control data by using an operation by the user 20 agreeing to delete the control data on the display unit 101 as a trigger. The display control unit 102 delivers the command to delete the control data to the main control unit 103. The main control unit 103 deletes both the control data and the area information from the storage unit 105.

When the user 20 performs an operation of disagreeing to delete the control data on the display unit 101, the display control unit 102 receives a command to lock the control data by using this operation as a trigger. The display control unit 102 delivers the command to lock the control data to the main control unit 103. The main control unit 103 delivers a command to lock the display unit 101 to the display control unit 102.

The display unit 101 locks a screen in response to the lock command from the display control unit 102. When a given period has passed, the update control unit 107 delivers a command to delete the control data and the area information to the main control unit 103. The main control unit 103 deletes both the control data and the area information.

When it is detected that the own device position goes out from the data maintenance area HA1 the data may be instantly deleted without checking with the user 20 whether to delete the control data.

FIG. 6 is a flowchart illustrating an outline of an updating process according to the first embodiment of the present invention. The number of times acquisition of the own device position is tried is referred to as the number of trials NB. An initial value of the number of trials NB is 0 and the number of trials NB increases whenever acquisition of the own device position fails. In the flowchart, the update process ends when the number of trials NB reaches 10.

The portable control device 100 determine whether the own device position can be acquired (S201). S201 is a similar process to the above-described S102. When the portable control device 100 determines that the own device position can be acquired (OK in S201), the portable control device 100 initializes the number of trials (sets the number of trials NB=0) (S202). The portable control device 100 acquires the own device position (S203). S203 is a similar process to the above-described S103. The portable control device 100 determines whether the acquired own device position is within the data maintenance area HA1 (S204). The portable control device 100 stores the area information in the storage unit 105 through the above-described area acquisition process. When the portable control device 100 determines that the own device position is outside the data maintenance area HAL that is, is the data non-maintenance area NHA (No in S204), the portable control device 100 deletes the control data and the area information (S205).

When the portable control device 100 determines that the own device position is not acquirable (NG in S201), the portable control device 100 waits for a designated time (S211). The portable control device 100 determines whether the number of trials NB satisfies the number of trials NB<10 (S212). When the number of trials NB satisfies the number of trials NB<10 (Yes in S212), the portable control device 100 increases the number of trials NB (number of trials NB=NB+1) and determines whether the own device position can be acquired again (S201). When the number of trials NB does not satisfy the number of trials NB<10 (No in S212), the portable control device 100 ends the update process.

When the own device position is in the data maintenance area HA1 (Yes in S204), the portable control device 100 waits for a designated time (S211) and determines whether the number of trials NB satisfies the number of trials NB<10 (Yes in S212). When the number of trials NB satisfies the number of trials NB<10 (Yes in S212), the portable control device 100 increases the number of trials NB (number of trials NB=NB+1) and determines whether the own device position can be acquired again (S201). When the number of trials NB does not satisfy the number of trials NB<10 (No in S212), the portable control device 100 ends the update process.

By using the configurations and the processes, it is possible to improve security since the area information and the control data stored in the storage unit 105 of the portable control device 100 are reliably deleted when the user 20 moves from the data maintenance area HA1 to the data non-maintenance area NHA (that is, the user moves from the data maintenance area HA1 to the outside of the data maintenance area HA1).

When the number of trials NB<10 is not satisfied in FIG. 6, the area acquisition process is ended. However, the value compared with the number of trials NB in this determination is not limited to 10. The number of trials NB can be set freely as long as the number of trials NB is a value equal to or greater than 1. When it is determined in S212 that the number of trials NB does not satisfy the number of trials NB<10, the portable control device 100 ends the update process without deleting the area information and the control data stored in the storage unit 105. However, the update control unit 107 starts to perform the update process every a preset timing of the update process. Therefore, the area information and the control data are not continuously stored in the storage unit 105 without being deleted indefinitely.

Second Embodiment

Figure 7:
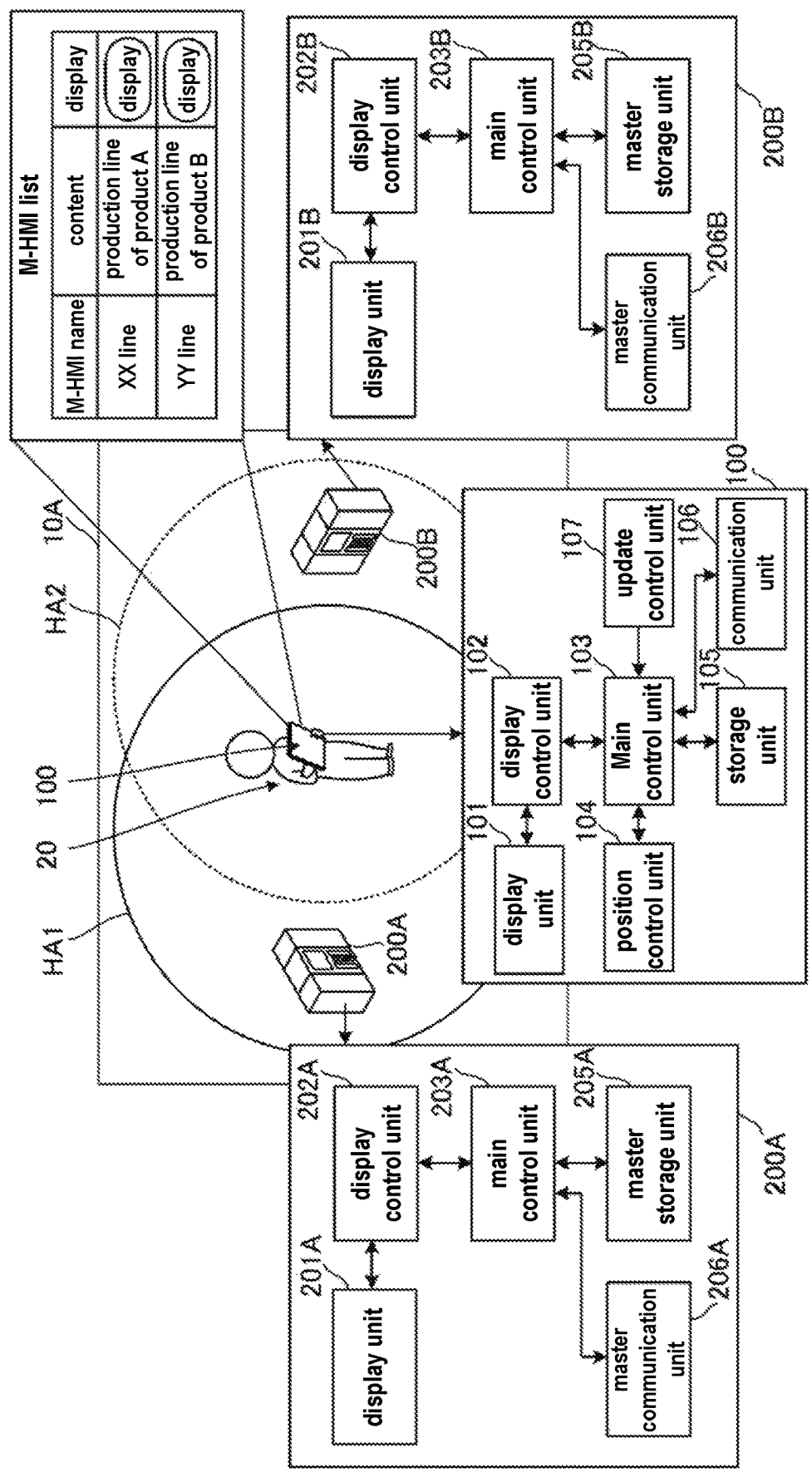
FIG. 7 is a diagram illustrating an overview of a control system according to a second embodiment of the present invention.

A portable control device, a control system, a control method, and a control program according to a second embodiment of the present invention will be described with reference to the drawings. FIG. 7 is a diagram illustrating an overview of a control system according to the second embodiment of the present invention.

As illustrated in FIG. 7, a control system 10A according to the second embodiment differs from the control system 10 according to the first embodiment in a process when the user 20 is located in an area where the data maintenance area HA1 overlaps a data maintenance area HA2. The other configurations of the control system 10A are the same as those of the control system 10, and description of the same portions will be omitted. The data maintenance area HA2 corresponds to a second area of the present invention. The own device position of the portable control device 100 is assumed to be specified using the method or the like described in the first embodiment.

The user 20 carrying the portable control device 100 is located in the area in which the data maintenance area HA1 overlaps a data maintenance area HA2. Subsequently, the display control unit 102 receives a request for transmitting control data of the data maintenance area HA1 (the control data of a master control device 200A) and the control data of the data maintenance area HA2 (the control data of a master control device 200B) by using an operation by the user 20 requesting the display unit 101 to transmit the control data as a trigger.

The display control unit 102 delivers a request for transmitting the control data of the data maintenance area HA1 to the main control unit 103. The main control unit 103 receives the request for transmitting the control data of the data maintenance area HAL The main control unit 103 transmits a request for transmitting a master communication unit 206A of the master control device 200A to transmit the control data via the communication unit 106.

The master communication unit 206A of the master control device 200A delivers the request for transmitting the control data to a main control unit 203A. The main control unit 203A acquires the control data of the data maintenance area HA1 from a master storage unit 205A. Hereinafter, the control data of the data maintenance area HA1 is referred to as control data DHA1.

The main control unit 203A delivers the control data DHA1 to the master communication unit 206A. The master communication unit 206A delivers the control data DHA1 to the communication unit 106 of the portable control device 100. The communication unit 106 delivers the control data DHA1 to the main control unit 103. The main control unit 103 stores the control data in the storage unit 105 and delivers the control data DHA1 to the display control unit 102.

Similarly, the portable control device 100 requests the master control device 200B to transmit the control data of the data maintenance area HA2 and acquires control data DHA2 of the data maintenance area HA2. Hereinafter, the control data DHA2 of the data maintenance area HA2 is referred to as control data DHA2.

A main control unit 203B of the master control device 200B acquires the control data of the data maintenance area HA1 from the master storage unit 205A in response to the request for transmitting the control data DHA2 from the portable control device 100. The main control unit 203B delivers the control data DHA2 to a master communication unit 206B. The master communication unit 206B transmits the control data DHA2 to the communication unit 106 of the portable control device 100.

The communication unit 106 delivers the control data DHA2 to the main control unit 103. The main control unit 103 stores the control data DHA2 in the storage unit 105 and delivers the control data DHA2 to the display control unit 102.

The requests for transmitting the control data with regard to the data maintenance area HA1 and the data maintenance area HA2 may be performed at one time.

The display control unit 102 displays both the control data DHA1 and the control data DHA2 on the display unit 101.

The user 20 can select the control data desired to be displayed from the control data DHA1 and the control data DHA2.

The display control unit 102 receives a selection of the control data by using this operation as a trigger and delivers the selection to the main control unit 103. The main control unit 103 causes the selected control data to remain in the storage unit 105 and deletes the unselected control data stored in the storage unit 105.

When both the pieces of control data remain and deviation from the data maintenance area HA1 occurs, the control data DHA1 may be deleted. When deviation from the data maintenance area HA2 occurs, the control data DHA2 may be deleted.

In the embodiment, the example in which two areas overlap has been described, but the number of areas which overlap may be 3 or more.

In the above-described embodiments, the portable control device 100 acquires the control data after it is determined that the own device acquiring the area information is within the area. However, the portable control device 100 can also acquire the control data and the area information simultaneously. In this case, when the portable control device 100 is outside the area, the portable control device 100 may delete the acquired control data and the area information instantly.

In the above-described embodiments, the aspect in which the data maintenance area HA and the data non-maintenance area NHA are on the same plane has been described. However, the own device position and the area information can also be configured 3-dimensinoally. For example, even when the number of stories in a building differs, the data maintenance area HA and the data non-maintenance area NHA can be defined.

In the above-described embodiments, the aspect in which it is determined that the portable control device 100 is within the data maintenance area HA has been described. However, the master control device 200 may determines whether the portable control device 100 is within the data maintenance area HA and may determine whether the control data can be transmitted based on the determination result.

In this case, the portable control device 100 transmits a request for transmitting the own device position and the control data to the master control device 200. The master control device 200 compares the position of the portable control device 100 with the area information stored by the own device. When the master control device 200 determines that the portable control device 100 is within the data maintenance area HA, the master control device 200 transmits the control data and the area information to the portable control device 100.

When the master control device 200 determines that the portable control device 100 is outside the data maintenance area HA, the master control device 200 does not transmit the control data and the area information.

REFERENCE SIGNS LIST

DHA1, DHA2 Control data
HA1, HA2 Data maintenance area
NHA Data non-maintenance area
NA, NB Number of trials
10, 10A Control system
20 User
100 Portable control device
101, 201 Display unit
102, 202 Display control unit
103, 203, 203A, 203B Main control unit
104 Position control unit
105 Storage unit
106, 106A, 106B Communication unit
107 Update control unit
200, 200A Master control device
205, 205A Master storage unit
206, 206A, 206B Master communication unit

What is claimed is:

1. A portable control device comprising:
a storage unit configured to store control data comprising a program, which controls a system located in a first area designated in a factory production line, and data used for executing the program;
a position control unit configured to acquire a position of the device itself;
a communication unit configured to receive the control data from the system when the position acquired by the position control unit is within the first area, wherein the control data enables the portable control device to perform a maintenance control of the system via a remote operation; and
a main control unit configured to delete the control data from the storage unit solely determined by the device itself without receiving instructions from the outside of the device regardless of network connection or remote control when the position acquired by the position control unit is outside the first area.

2. The portable control device according to claim 1, wherein the main control unit causes the communication unit to receive the control data and store the received control data in the storage unit when the position acquired by the position control unit is within the first area.

3. The portable control device according to claim 2, further comprising:
a display unit; and
a display control unit configured to display the control data on the display unit,
wherein the main control unit instructs the display control unit to display the control data on the display unit when the position acquired by the position control unit is within the first area, and
wherein the main control unit instructs the display control unit not to display the control data on the display unit when the position acquired by the position control unit is outside the first area.

4. The portable control device according to claim 2 wherein the position control unit acquires the position using a satellite positioning system.

5. The portable control device according to claim 2, wherein the first area is an area where control of the system in which the control data assigned to the first area is used is permitted.

6. The portable control device according to claim 2, wherein the main control unit has a function of receiving a selection of whether the control data is deleted.

7. The portable control device according to claim 1, further comprising:
a display unit; and
a display control unit configured to display the control data on the display unit,
wherein the main control unit instructs the display control unit to display the control data on the display unit when the position acquired by the position control unit is within the first area, and wherein the main control unit instructs the display control unit not to display the control data on the display unit when the position acquired by the position control unit is outside the first area.

8. The portable control device according to claim 7 wherein the position control unit acquires the position using a satellite positioning system.

9. The portable control device according to claim 7, wherein the first area is an area where control of the system in which the control data assigned to the first area is used is permitted.

10. The portable control device according to claim 1, wherein the position control unit acquires the position using a satellite positioning system.

11. The portable control device according to claim 10, wherein the first area is an area where control of the system in which the control data assigned to the first area is used is permitted.

12. The portable control device according to claim 1, wherein the first area is an area where control of the system in which the control data assigned to the first area is used is permitted.

13. The portable control device according to claim 12, wherein a second area different from the first area is an area where control of the system in which the control data assigned to the second area is used is permitted.

14. The portable control device according to claim 13, wherein the main control unit receives a selection of the control data of the first area and the control data of the second area when the position acquired by the position control unit is determined to be in an area where the first area overlaps the second area.

15. The portable control device according to claim 1, wherein the main control unit has a function of receiving a selection of whether the control data is deleted.

16. A control system comprising:
a master storage unit configured to store control data;
a master communication unit configured to transmit the control data; and
the portable control device according to claim 1.

17. A control method of a portable control device, wherein the portable control device performs:
storing control data that comprises a program controlling a system located in a first area designated in a factory production line, and data used for executing the program;
acquiring a position of the device itself;
receiving the control data when the position acquired is within the first area, wherein the control data enables the portable control device to perform a maintenance control of the system via a remote operation; and
deleting the control data solely determined by the device itself without receiving instructions from the outside of the device regardless of network connection or remote control when the position is outside the first area.

18. The control method according to claim 17, wherein the portable control device performs:
receiving the control data and storing the control data when the position is within the first area.

19. A non-transitory storage medium storing a control program, which causes a portable control device to perform:
storing control data that comprises a program controlling a system located in a first area designated in a factory production line, and data used for executing the program;
acquiring a position of the device itself;
receiving the control data when the position acquired is within the first area, wherein the control data enables the portable control device to perform a maintenance control of the system via a remote operation; and
deleting the control data solely determined by the device itself without receiving instructions from the outside of the device regardless of network connection or remote control when the position is outside the first area.

20. The non-transitory storage medium storing the control program according to claim 19, causing the portable control device to perform:
receiving the control data and storing the control data when the position is within the first area.

* * * * *